Patented Aug. 27, 1946

2,406,585

UNITED STATES PATENT OFFICE 2,406,585

GELATINIZATION OF STARCH

Ben F. Buchanan, Leonia, N. J., and Robert L. Lloyd, Laurelton, N. Y., assignors to American Maize-Products Company, a corporation of Maine No Drawing. Application July 30, 1942,
Serial No. 452,975

2 Claims. (Cl. 99—92)

This invention relates to a starch composition adapted on heating with a large proportion of water to give gelatinized starch of minimized tendency to retrogradation and of abnormally high viscosity, transparency, and specific volume. The invention relates also to the method of making the gelatinized product.

There is extensive use of gelatinized starch in the food industries, as in pie fillings, salad dressings, and puddings. In making such gelatinized starch, it is customary to heat a sweetened starch slurry to a temperature near its boiling point, flavoring being sometimes added at this stage. The resulting starch paste may be used as such or mixed while hot or after partial cooling with other ingredients in the preparation of finished food products.

Preparations so made undergo retrogradation of the gelatinized starch as the product stands before use. There is a shrinkage of the gelatinized starch resulting in decreased volume of the gelatinized starch, decreased viscosity, and the development of cloudiness, due to the reversal of the gelatinization process and the appearance of ungelatinized or incompletely gelatinized particles of the starch.

The present invention provides a method and composition for minimizing these disadvantages in gelatinized starch and also increasing the initial volume of the gelatinized starch and the initial viscosity, and transparency of the starch in both the paste and gel forms.

Briefly stated, the invention comprises gelatinizing starch in the presence of a large proportion of water and starch conversion syrup solids, the water being used in such amount as to make the starch mixture a free flowing suspension or slurry at the time the gelatinization is initiated and a free flowing liquid after gelatinization has been effected but before cooling and preferably in the proportion of at least six parts by weight of water to one of starch. The invention comprises the use also of sucrose, lactose, invert sugar, dextrose or a mixture of these in addition to the syrup solids, as a part of the sweetening agent, the total proportion of the sweetening agent being for most purposes in excess of the proportion of starch.

Using the composition of the invention and heating the starch in contact with the large proportion of water and starch conversion syrup solids, there is obtained a gelatinized starch having a viscosity that may be as high as 150% of the viscosity obtained in comparable manner when the sweetening agent used is the same in proportion to the starch and consists entirely of sucrose. Likewise the transparency may be increased to as much as 165% and the specific volume of the gelatinized starch to 128% of that obtained with the sucrose material. Furthermore, the rate of decrease in transparency, viscosity and volume of the gelatinized starch is minimized by the use of the starch conversion syrup solids, as will be discussed more fully in a later section in which quantitative data are presented.

As the starch used, corn starch is preferred although there may be used other starches such as potato, rice, tapioca, wheat, or like cereal or root starch. The starch is preferably powdered or granular so that it may be premixed intimately with the starch conversion syrup solids in dried condition or suspended readily in an aqueous solution containing such solids.

The starch conversion syrup solids used should have a degree of conversion corresponding to about 20 to 70 parts of reducing sugars calculated as dextrose. Particularly satisfactory results have been obtained in the production of gelatinized starch of increased relative volume, viscosity, transparency, and minimized viscosity to retrogradation when the degree of conversion of the starch corresponds to 24 to 55% of reducing sugars calculated as dextrose. Non-sugar components of the starch conversion syrup solids are important in giving the stated improved properties of the product of the present invention and also in avoiding seeping of syrup from the gelatinized material (by syneresis) as the gel stands and in improving the texture. Spray dried starch conversion syrup solids of D. E. stated are the preferred type of material.

Various proportions of the ingredients are preferred for the different uses to which the gelatinized starch is to be put. In no case, however, is the proportion of water to be less than the amount required to make the mixture a free flowing liquid after gelatinization and before cooling, and should be at least approximately four times the weight of the starch if all the advantages from the gelatinization in the presence of the starch conversion syrup solids are to be realized.

Examples of suitable compositions for various food products are given in the table below, it being understood that conventional flavoring, coloring, or other admixtures of usual type, for such products may be present.

| Food product | Parts by weight | | | Syrup solids percent of total sweetener |
|---|---|---|---|---|
| | Starch | Water | Total sweetener | |
| Pie fillings | 5–10 | 35–60 | 25–50 | 25–100 |
| Salad dressings | 3–8 | 40–60 | 4–6 | 25–100 |
| Puddings | 5–10 | 60–70 | 20–40 | 5–50 |

Preferred proportions of the starch conversion syrup solids to total sweetening agent are 40 to 75% for pie fillings and salad dressings and 10 to 40% for puddings. In general, the syrup solids should constitute about 10 to 75% of the total sweetener, proportions being expressed herein as parts by weight unless otherwise specifically stated.

The remainder of the sweetening agent above the starch conversion syrup solids is ordinarily sucrose although it may be substituted by one of the other sweetening agents given above if loss of sweetness due to such substitution is not objectionable in a given use.

The composition for use in making the selected food product is heated either alone or after the addition of a small amount of acid till the starch is gelatinized. Other conventional ingredients may be added, either before or after the gelatinization of the starch, as for example, fruit juices, flavoring agents such as chocolate or cocoa, salts, and eggs.

If acid is used in the practice of the invention, it is used in kind and proportion and at temperatures that are conventional in starch gelatinization for food product. Thus there may be used 0.1 to 0.5 per cent on the weight of the finished gel of malic, citric, tartaric, lactic, acetic acid or a combination of these, at the temperatures stated above.

Such acid used in a typical procedure was a mixture containing 2 parts malic, 1 part citric, and 1 part tartaric acid mixed with 4 parts of water so as to give a 50% acid solution constituting the 0.44 gram used.

For the gelatinization there are used conventional temperatures and times, the improved results obtained being due to the inclusion of the starch conversion syrup solids and not to any change in the technique of the heating. Thus the gelatinization is effected at a temperature between about 175° F. and the boiling point of the mixture under the prevailing pressure and suitably between 175° and 240° F., the latter temperature being reached in an autoclave at about 10 pounds steam pressure. High temperatures within the range stated serve to effect thorough sterilization as well as gelatinization. Ordinarily the temperature of gelatinization is about 180° to 215° F.

As to the time, only 1 or 2 minutes at the maximum temperature is necessary. Thus, a batch of the material is heated with steam until there is produced what is known as a rolling boil, by which is meant rising of the steam from the bottom of the charge completely to the top before the steam is condensed. When this rolling boil is obtained then the steam is turned off. The time required to bring the batch past the temperature of the beginning of gelatinization up to the maximum plus the time of cooling through the range of temperatures of gelatinization is adequate to produce the gelatinization. At such temperature and in the presence of the large proportion of water recited above, the starch is completely gelatinized, that is, forms a substantially clear, free flowing liquid with the water at the temperature of gelatinization.

The product is then ready for use or further compounding either before or after cooling. Further additional ingredients may be incorporated. In any case, however, the cooling is suitably made rather rapid.

It will be understood that the temperature selected will vary somewhat with the kind of starch chosen in making the composition, the temperatures given being particularly suitable for corn starch and being at least reasonably satisfactory for other varieties of starch.

In testing the quality of the gelatinized starch a number of properties are determined.

One of these properties is the specific volume of the gelatinized starch, that is the volume for unit of weight of starch used. This is determined by mixing thoroughly 50 grams of gelatinized and cooled starch gel, with 50 grams of water, centrifuging the mixture at 1500 R. P. M. for 5 minutes, and measuring the volume in ml. of the gelatinized starch thrown down by the centrifuging, all in comparable manner.

Another test is the viscosity as determined by the MacMichael viscosimeter, No. 22 wire being used, the bob being 2 cm. in diameter, the immersion of the bob being 4 cm., the temperature 71° F., and the R. P. M. 20 in all cases.

Transparency is determined by means of the Photovolt Lumetron. Arbitrary settings are first made using such a standard iris opening for the light that readings of the most transparent sample may be made on the scale of the meter. The same iris opening is then used for each sample of the product of the invention when tested one week later.

For making these tests there were formed compositions including in each case the following:

| | Grams |
|---|---|
| Starch | 9.30 |
| Total sweetening agent | 100 |
| Water | 100 |
| Acid | 0.44 |

The sweetening agent or sweetener was a mixture of sucrose and spray dried corn syrup solids of 42 D. E.

The proportion of corn syrup solids to total sweetening agent in the various mixtures and the results of the tests on the gelatinized product are shown in the tables below.

*Properties of starch gelatinized with various proportions of syrup solids to total sweetening agent*

| Corn syrup solids per cent of sweetening agent | 0 | 25 | 50 | 75 | 100 |
|---|---|---|---|---|---|
| Relative viscosity | 36 | 35 | 35 | 40 | 55 |
| Specific volume of gelatinized starch: | | | | | |
| Initially | 23.3 | 24.8 | 24.6 | 26.4 | 30.0 |
| After 1 week | 20.6 | 22.2 | 22.8 | 23.9 | 27.0 |
| Transparency: | | | | | |
| Initially | 61 | 62 | 71 | 81 | 102 |
| After 1 week | 44 | 52 | 60 | 66 | 88 |

There will be noted from this table not only the increase in desirable properties as the proportion of the corn syrup solids to the total weight of such solids and sucrose increases, but also decreased retrogradation, this decrease resulting in satisfactory retention of the desirable properties as the composition stands. Combinations containing more and also less total sweetener gave differences comparable to those shown in the table above.

The improvement in transparency is particularly desirable in connection with making of fruit pie fillings in which the pie maker wishes the fruit to appear clearly and conspicuously in the filling and not be obscured to any large extent due to the retrogradation and clouding of the starch gel used in the filling.

Using starch gelatinized without acid, there have been obtained data such as those tabulated above showing a pronounced effect of gelatinization in the presence of starch conversion syrup solids in increasing the viscosity and transparency of the starch in either paste or gel form and specific volume of the starch in gel form, as well as decreased retrogradation as compared to starch gelatinized in the presence of sucrose as the sole sweetening agent.

In general, the gelatinized starch of the present invention is useful in connection with pie fillings, salad dressings, puddings and like food products involving the use of starch gelatinized with a large volume of water to a substantially clear gel.

It will be understood that it is intended to cover all changes and modifications of the example of the invention herein chosen for the purpose of illustration which do not constitute departures from the spirit and scope of the invention.

What we claim is:

1. The method of making a food product comprising forming a flowable suspension of starch in finely divided condition in an aqueous solution including dissolved sucrose, starch conversion syrup solids, in proportion equal to about 25% to 75% of the total weight of sucrose and said solids and of reducing sugars content calculated as dextrose of 24% to 55%, and water in the proportion of 40 to 60 parts by weight for 3 to 8 parts of total starch present and heating the suspension to gelatinize the starch completely, the proportion of sucrose and syrup solids being at least approximately equal to that of the starch and the heating giving a free-flowing liquid product containing gelatinized starch of abnormally high viscosity, transparency, and specific volume and of abnormally low tendency to retrogradation.

2. A pie filling comprising flavoring material, starch in completely gelatinized condition, sucrose, starch conversion syrup solids of reducing sugars content calculated as dextrose 24% to 55%, and water, the proportion of water being at least 6 parts by weight to 1 part of total starch present, the proportion of the syrup solids being 25 to 75 parts for 100 parts of total weight of the said solids and sucrose, and the proportion of sucrose and said solids together being in excess of the proportion of starch present.

BEN F. BUCHANAN.
ROBERT L. LLOYD.

Certificate of Correction

Patent No. 2,406,585.

August 27, 1946.

BEN F. BUCHANAN ET AL.

It is hereby certified that error appears in the printed specification of the above numbered patent requiring correction as follows: Column 2, line 19, for "viscosity" read *tendency*; and that the said Letters Patent should be read with this correction therein that the same may conform to the record of the case in the Patent Office.

Signed and sealed this 3rd day of December, A. D. 1946.

[SEAL]

LESLIE FRAZER,
*First Assistant Commissioner of Patents.*

In general, the gelatinized starch of the present invention is useful in connection with pie fillings, salad dressings, puddings and like food products involving the use of starch gelatinized with a large volume of water to a substantially clear gel.

It will be understood that it is intended to cover all changes and modifications of the example of the invention herein chosen for the purpose of illustration which do not constitute departures from the spirit and scope of the invention.

What we claim is:

1. The method of making a food product comprising forming a flowable suspension of starch in finely divided condition in an aqueous solution including dissolved sucrose, starch conversion syrup solids, in proportion equal to about 25% to 75% of the total weight of sucrose and said solids and of reducing sugars content calculated as dextrose of 24% to 55%, and water in the proportion of 40 to 60 parts by weight for 3 to 8 parts of total starch present and heating the suspension to gelatinize the starch completely, the proportion of sucrose and syrup solids being at least approximately equal to that of the starch and the heating giving a free-flowing liquid product containing gelatinized starch of abnormally high viscosity, transparency, and specific volume and of abnormally low tendency to retrogradation.

2. A pie filling comprising flavoring material, starch in completely gelatinized condition, sucrose, starch conversion syrup solids of reducing sugars content calculated as dextrose 24% to 55%, and water, the proportion of water being at least 6 parts by weight to 1 part of total starch present, the proportion of the syrup solids being 25 to 75 parts for 100 parts of total weight of the said solids and sucrose, and the proportion of sucrose and said solids together being in excess of the proportion of starch present.

BEN F. BUCHANAN.
ROBERT L. LLOYD.

Certificate of Correction

Patent No. 2,406,585.

August 27, 1946.

BEN F. BUCHANAN ET AL.

It is hereby certified that error appears in the printed specification of the above numbered patent requiring correction as follows: Column 2, line 19, for "viscosity" read *tendency*; and that the said Letters Patent should be read with this correction therein that the same may conform to the record of the case in the Patent Office.

Signed and sealed this 3rd day of December, A. D. 1946.

[SEAL]

LESLIE FRAZER,
*First Assistant Commissioner of Patents.*